(12) United States Patent
Kroack

(10) Patent No.: US 12,510,753 B1
(45) Date of Patent: Dec. 30, 2025

(54) AIRCRAFT HEADS UP DISPLAY

(71) Applicant: John C. Kroack, Everett, WA (US)

(72) Inventor: John C. Kroack, Everett, WA (US)

( * ) Notice: Subject to any disclaimer, the term of this patent is extended or adjusted under 35 U.S.C. 154(b) by 0 days.

(21) Appl. No.: 19/055,672

(22) Filed: Feb. 18, 2025

(51) Int. Cl.
*G02B 27/01* (2006.01)
*B64D 43/00* (2006.01)

(52) U.S. Cl.
CPC ......... *G02B 27/0149* (2013.01); *B64D 43/00* (2013.01); *G02B 27/0101* (2013.01); *G02B 2027/0154* (2013.01)

(58) Field of Classification Search
CPC ............... G02B 27/01; G02B 27/0101; G02B 27/0149; G02B 2027/0154; B64D 43/00
See application file for complete search history.

(56) References Cited

U.S. PATENT DOCUMENTS

| | | | |
|---|---|---|---|
| 3,967,799 A * | 7/1976 | Muller ................. | G05D 1/0676 |
| | | | 701/4 |
| 4,847,603 A * | 7/1989 | Blanchard ................ | H04N 3/22 |
| | | | 348/169 |
| 6,567,014 B1 | 5/2003 | Hansen | |
| 7,216,069 B2 | 5/2007 | Hett | |
| 8,155,806 B2 | 4/2012 | Suddreth | |
| 9,069,163 B2 | 6/2015 | Schon | |
| 9,176,324 B1 * | 11/2015 | Scherer ................. | G02B 27/01 |
| D885,278 S | 5/2020 | Jeon | |
| 2009/0201177 A1 | 8/2009 | Soler | |
| 2015/0088342 A1 * | 3/2015 | Conner ................. | B64D 45/00 |
| | | | 701/14 |
| 2016/0282620 A1 | 9/2016 | Park | |
| 2018/0173387 A1 * | 6/2018 | Scarfone .............. | G01C 23/005 |
| 2019/0004081 A1 * | 1/2019 | Tremblay .............. | B64C 13/503 |
| 2019/0118939 A1 * | 4/2019 | Cantinaud ............ | G05D 1/0083 |
| 2019/0122572 A1 * | 4/2019 | Morellec ................. | G08G 5/51 |
| 2020/0191604 A1 * | 6/2020 | Ganille ................ | G01C 23/005 |
| 2023/0350199 A1 * | 11/2023 | Auerbach .............. | B64D 27/34 |
| 2024/0294267 A1 * | 9/2024 | Celest .................... | B64D 43/00 |

\* cited by examiner

*Primary Examiner* — Cory A Almeida

(57) ABSTRACT

The aircraft heads up display is an instrument for use with an aircraft. The aircraft heads up display is a mechanical structure. The aircraft heads up display measures: a) the roll angle of the aircraft; b) the pitch angle of the aircraft; and, c) the slip angle of the aircraft. The aircraft heads up display incorporates an instrument structure and an accessory structure. The instrument structure measures the roll angle, the pitch angle, and the slip angle of the aircraft. The accessory structure is an optional structure that forms an electric connection with the aircraft. The accessory structure displays other measured flight parameters of the aircraft.

5 Claims, 8 Drawing Sheets

AIRCRAFT HEADS UP DISPLAY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The aircraft heads up display is an instrument. The aircraft heads up display is configured for use with an aircraft. The aircraft heads up display is a mechanical structure. The aircraft heads up display measures: a) the roll angle of the aircraft; b) the pitch angle of the aircraft; and, c) the slip angle of the aircraft. The roll angle of the aircraft is a measure of the angle between the plane of the wings or the aircraft relative to a horizontal orientation. The pitch angle is a measure of the angle between the primary sense of direction of the aircraft and the horizontal orientation. The slip angle is the measure of the angle between the primary sense of direction of the aircraft and the direction of the air flowing over the airfoil of the aircraft. The aircraft heads up display comprises an instrument structure and an accessory structure. The instrument structure measures the roll angle, the pitch angle, and the slip angle of the aircraft. The accessory structure is an optional structure that forms an electric connection with the aircraft. The accessory structure displays other measured flight parameters of the aircraft.

These together with additional objects, features and advantages of the aircraft heads up display will be readily apparent to those of ordinary skill in the art upon reading the following detailed description of the presently preferred, but nonetheless illustrative, embodiments when taken in conjunction with the accompanying drawings.

In this respect, before explaining the current embodiments of the aircraft heads up display in detail, it is to be understood that the aircraft heads up display is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the aircraft heads up display.

It is therefore important that the claims be regarded as including such equivalent construction insofar as they do not depart from the spirit and scope of the aircraft heads up display. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
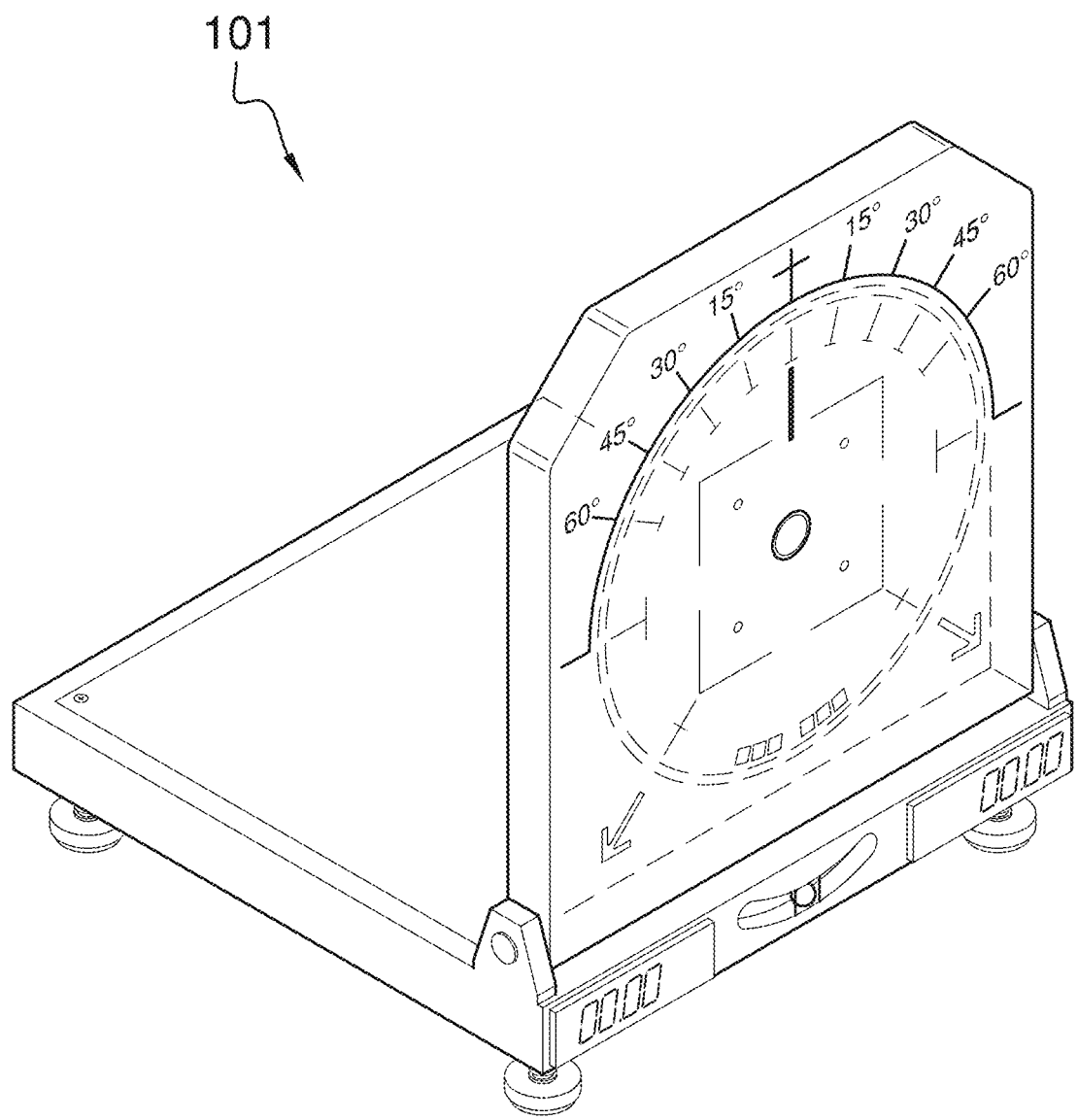
FIG. 1 is a perspective view of an embodiment of the disclosure.
Figure 2:
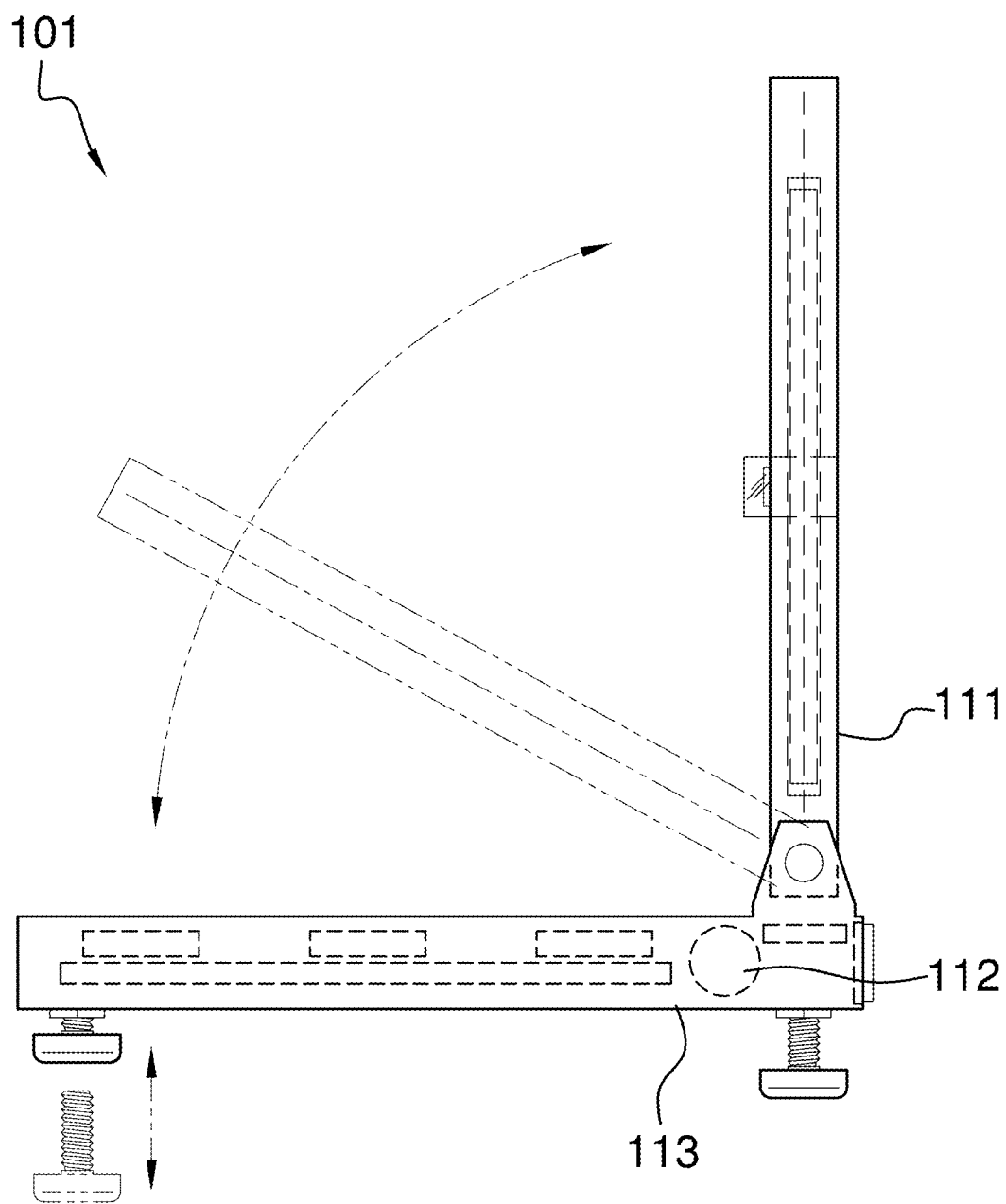
FIG. 2 is a side view of an embodiment of the disclosure.
Figure 3:
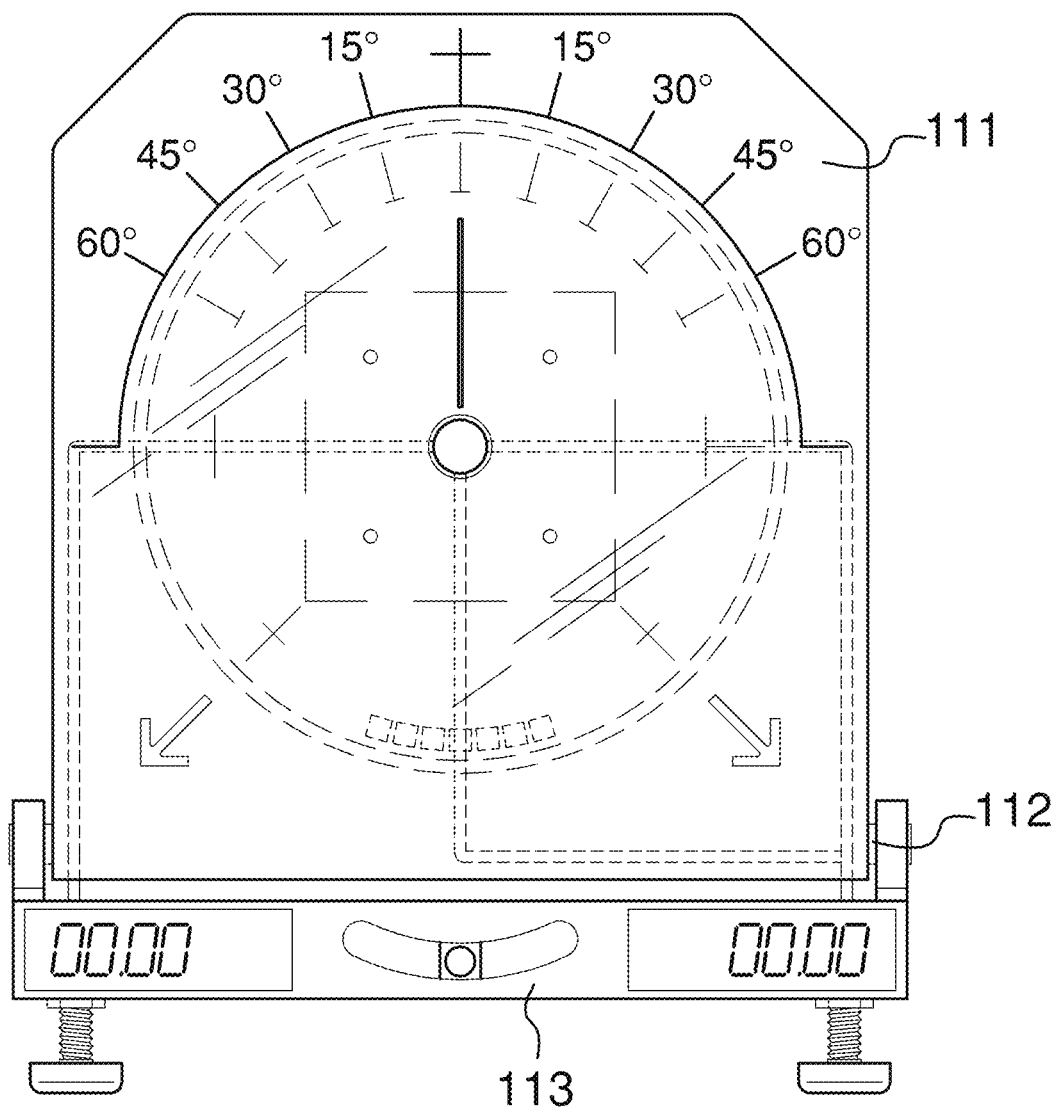
FIG. 3 is a front view of an embodiment of the disclosure.
Figure 4:
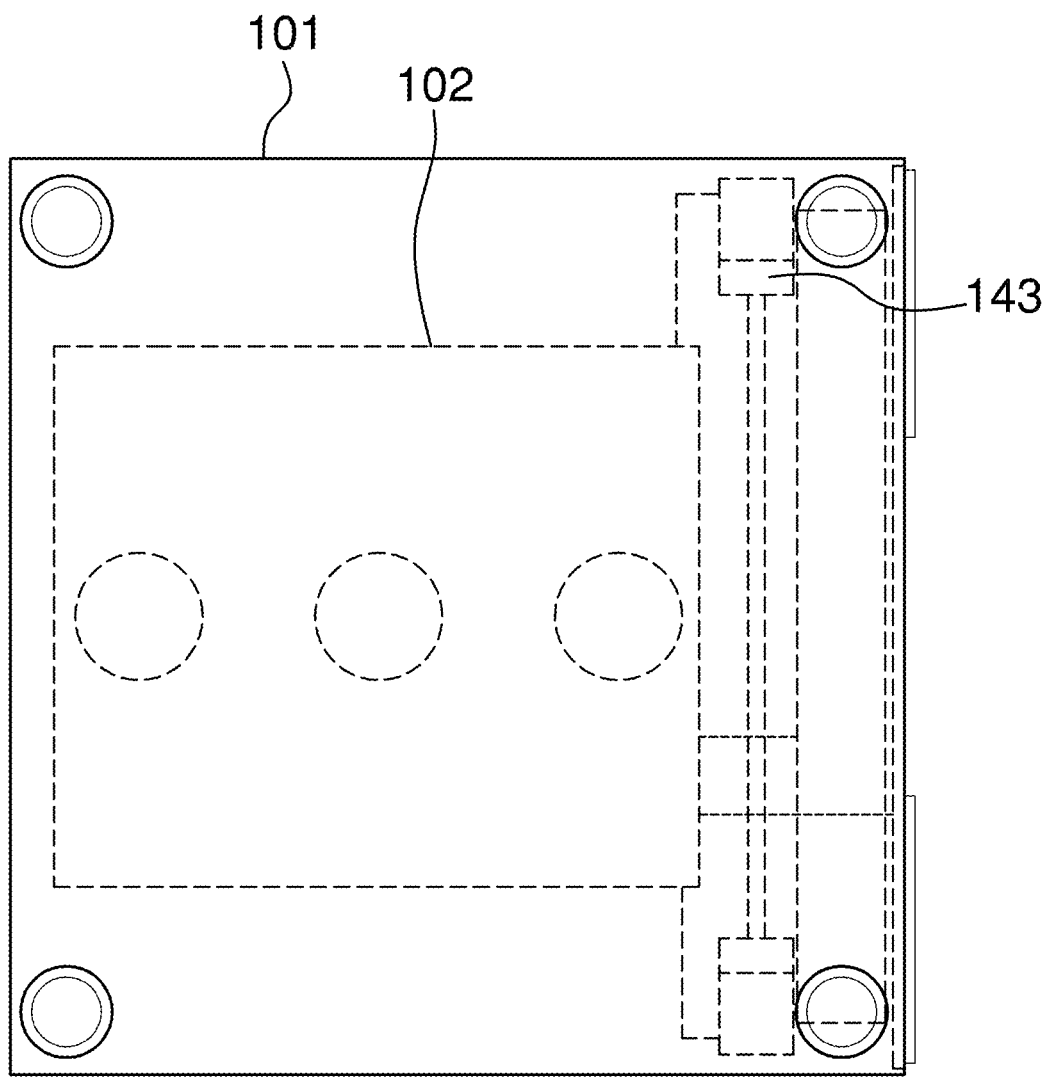
FIG. 4 is a bottom view of an embodiment of the disclosure.
Figure 5:
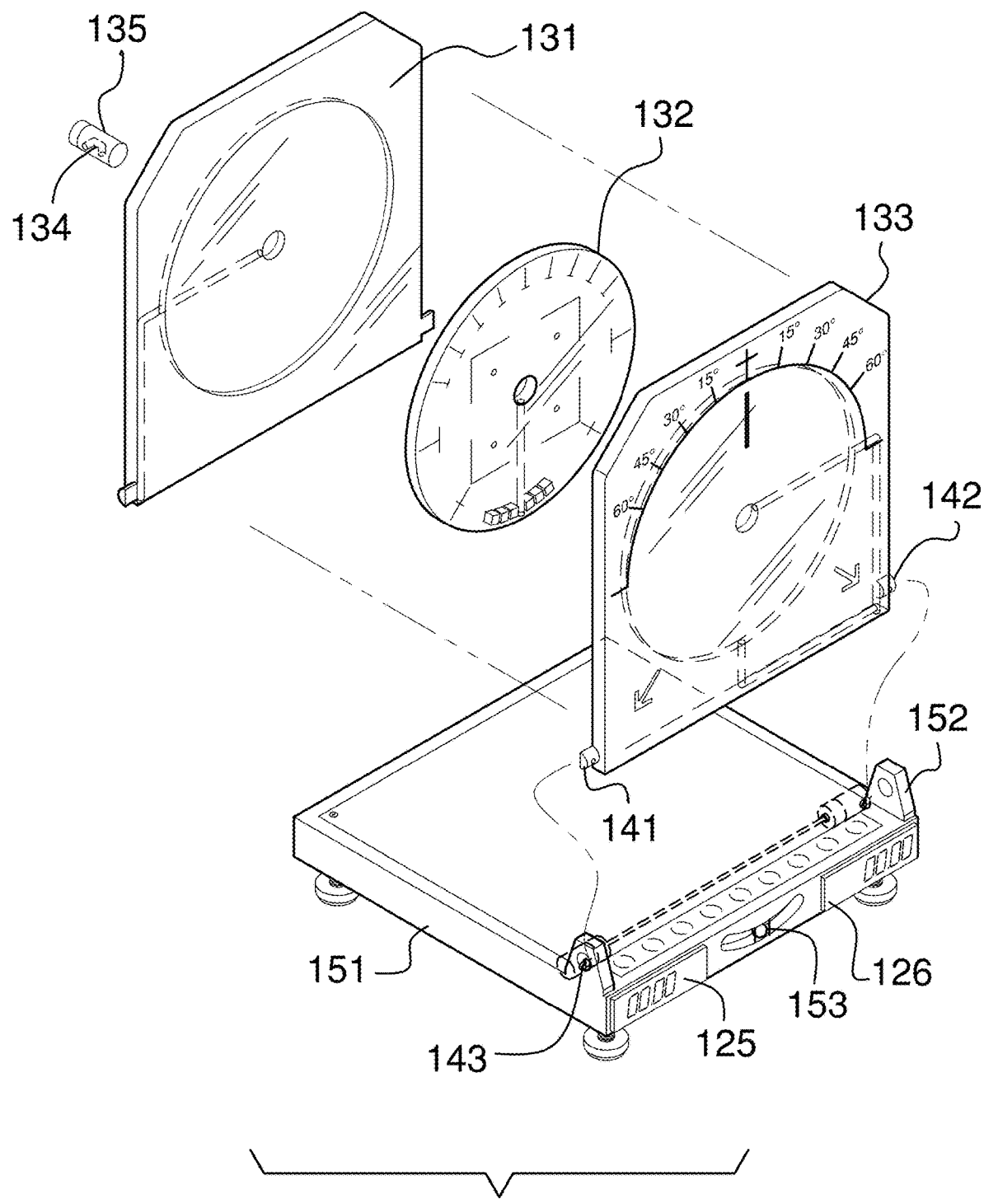
FIG. 5 is an exploded view of an embodiment of the disclosure.
Figure 6:
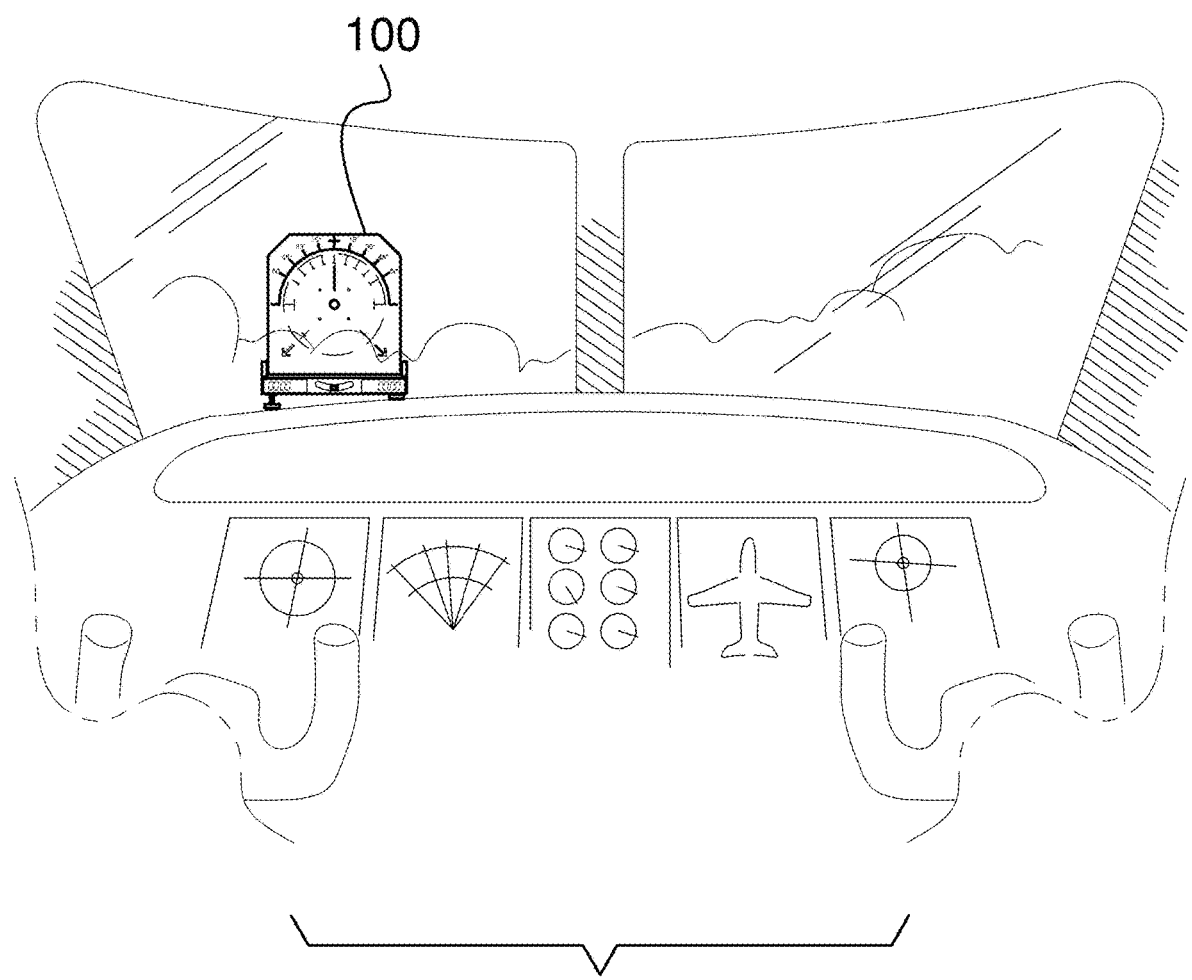
FIG. 6 is an in-use view of an embodiment of the disclosure.
Figure 7:
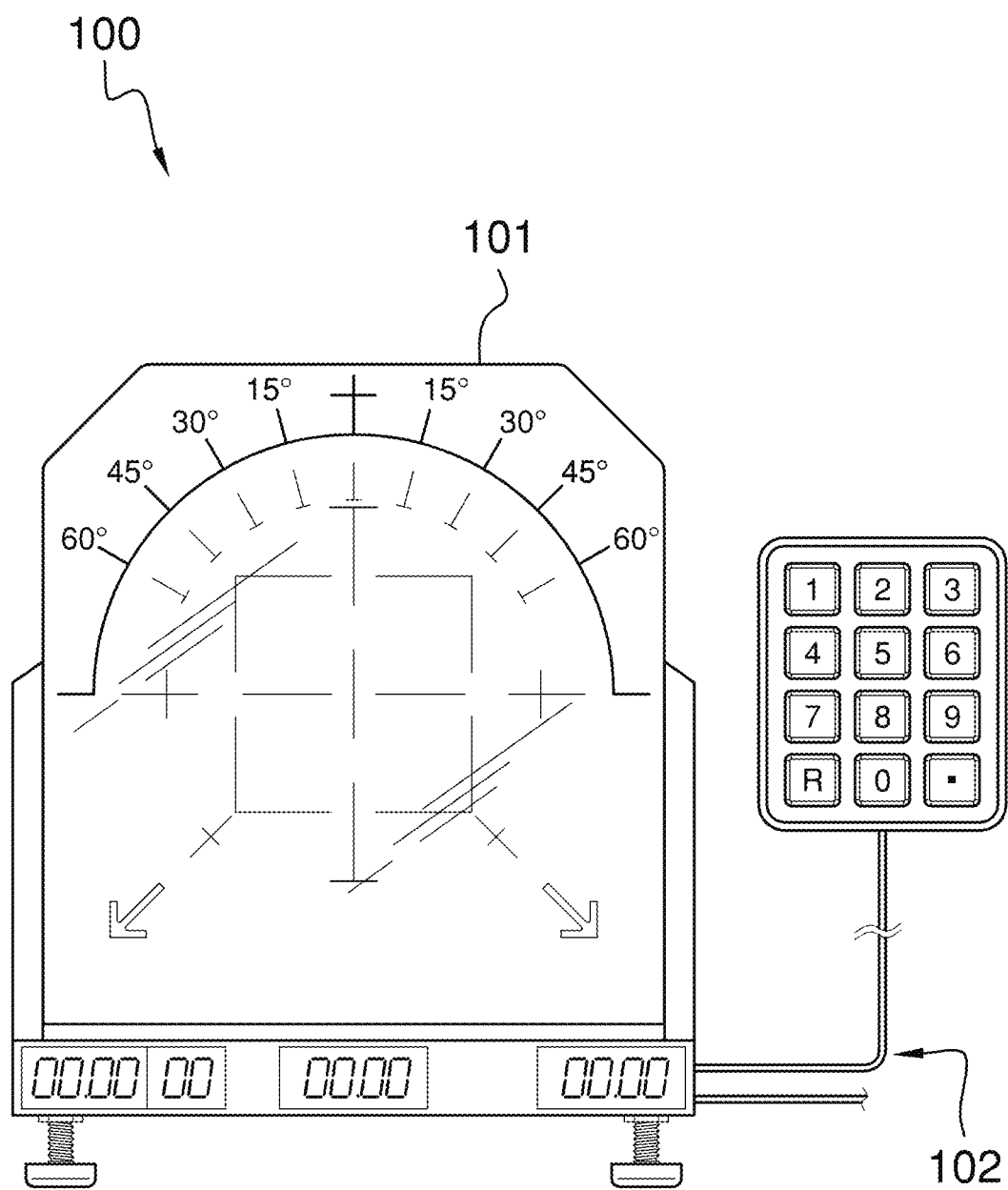
FIG. 7 is a front view of an alternate embodiment of the disclosure.
Figure 8:
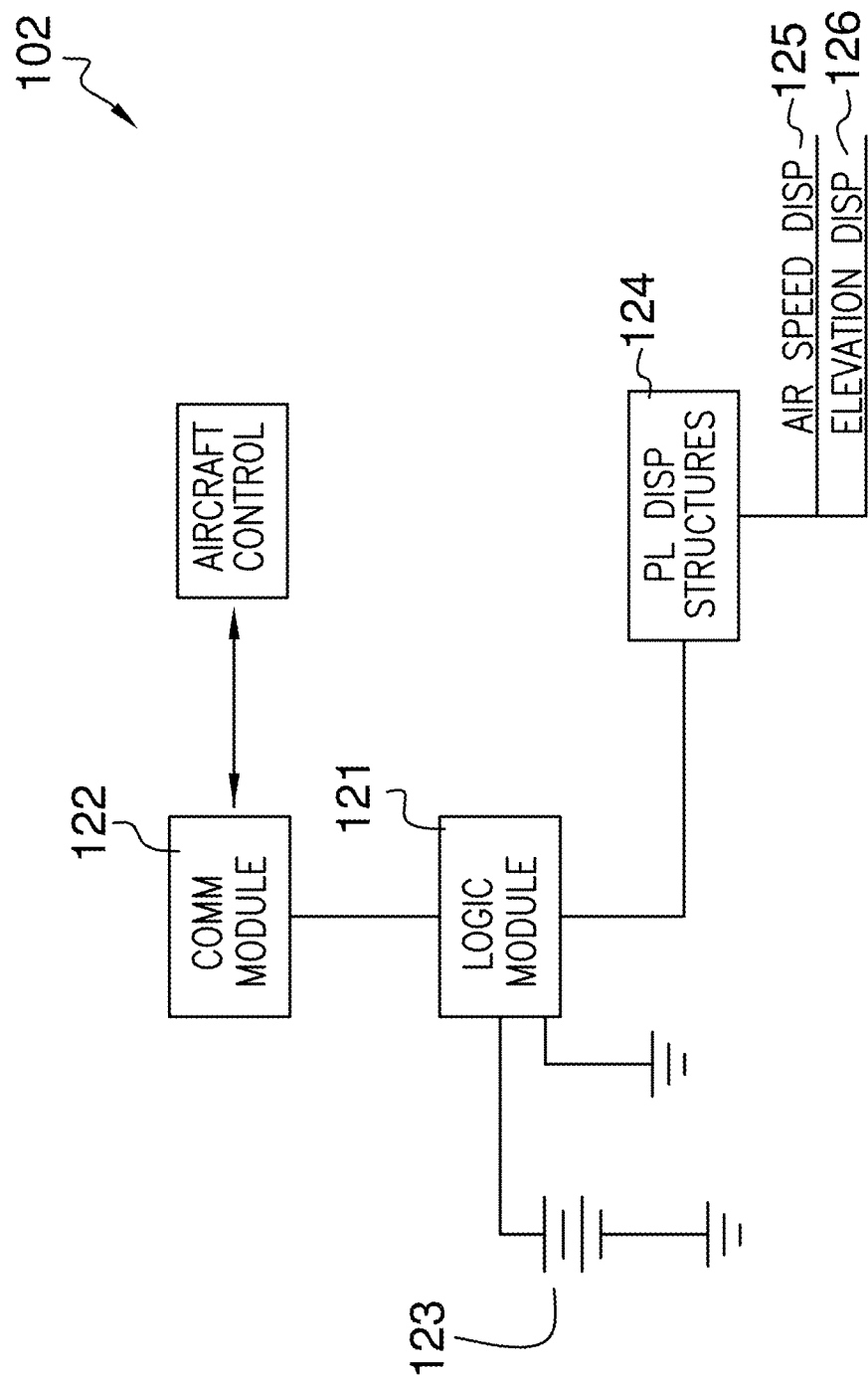
FIG. 8 is a schematic view of an embodiment of the disclosure.

Detailed reference will now be made to one or more potential embodiments of the disclosure, which are illustrated in FIGS. 1 through 8.

The aircraft heads up display 100 (hereinafter invention) is an instrument. The invention 100 is configured for use with an aircraft. The invention 100 is a mechanical structure. The invention 100 measures: a) the roll angle of the aircraft; b) the pitch angle of the aircraft; and, c) the slip angle of the aircraft. The roll angle of the aircraft is a measure of the angle between the plane of the wings or the aircraft relative to a horizontal orientation. The pitch angle is a measure of the angle between the primary sense of direction of the aircraft and the horizontal orientation. The slip angle is the measure of the angle between the primary sense of direction of the aircraft and the direction of the air flowing over the airfoil of the aircraft. The invention 100 comprises an instrument structure 101 and an accessory structure 102. The instrument structure 101 measures the roll angle, the pitch angle, and the slip angle of the aircraft. The accessory structure 102 is an optional structure that forms an electric connection with the aircraft. The accessory structure 102 displays other measured flight parameters of the aircraft.

The instrument structure 101 is a physical device. The instrument structure 101 is a measurement device. The instrument structure 101 mounts in the cockpit of the aircraft. The instrument structure 101 is positioned in the cockpit of the aircraft such that the cant between the primary sense of direction of the aircraft is fixed. The instrument structure 101 is positioned in the cockpit of the aircraft such that the instrument structure 101 is visible to the pilot of the aircraft. The physical structure of the instrument structure 101 is sensitive to the motion of the aircraft relative to the force of gravity. The instrument structure 101 visibly displays the roll angle of the aircraft during flight. The instrument structure 101 visibly displays the pitch angle of the aircraft during flight. The instrument structure 101 visibly displays the slip angle of the aircraft during flight. The accessory structure 102 mounts on and in the instrument structure 101.

The instrument structure 101 comprises a display structure 111, a fluid management structure 112, and a pedestal structure 113.

The display structure 111 is a mechanical structure. The display structure 111 forms the structure of the instrument structure 101 that is sensitive to the motion of the aircraft relative to the force of gravity. The display structure 111 visibly displays the roll angle of the aircraft during flight. The display structure 111 visibly displays the pitch angle of the aircraft during flight. The display structure 111 visibly displays the slip angle of the aircraft during flight. The display structure 111 comprises a rear pan structure 131, a weighted disk structure 132, a front disk structure 133, a lamp structure 134, and a rotating disk mount 135.

The rear pan structure 131 is a pan shaped structure. The rear pan structure 131 is formed from a transparent material. The rear pan structure 131 is formed from a fluid impermeable material. The rear pan structure 131 forms a protected space that contains: a) the weighted disk structure 132; b) the rotating disk mount 135; and, c) the liquid phase compound of the fluid management structure 112. The rear pan structure 131 is the structure of the instrument structure 101 that attaches to the pedestal structure 113.

The weighted disk structure 132 is a disk shaped structure. The weighted disk structure 132 is a transparent structure. The weighted disk structure 132 mounts in the protected space forms by the rear pan structure 131. The weighted disk structure 132 is fully contained within the rear pan structure 131. The rotating disk mount 135 physically secures the weighted disk structure 132 in the rear pan structure 131 such that the weighted disk structure 132 rotates freely within the rear pan structure 131.

The weighted disk structure 132 is a weighted structure. By weighted structure is meant that the weighted disk structure 132 has a non-uniform weight distribution that offsets the center of mass of the weighted disk structure 132 from the center of rotation of the weighted disk structure 132. The weighted disk structure 132 has a non-uniform weight distribution that offsets the center of mass of the weighted disk structure 132 from the center axis of the weighted disk structure 132. The offset of the center of mass from the axis of rotation ensures that the weighted disk structure 132 will always maintain constant position relative to the force of gravity. By a constant position relative to the force of gravity is meant that a perpendicular line drawn from the axis of rotation of the weighted disk structure 132 and the center of mass of the weighted disk structure 132 will always be parallel to the force of gravity.

The weighted disk structure 132 is a calibrated structure. By calibrated structure is meant that the weighted disk structure 132 visibly displays a calibration image that allows the pilot to determine the roll angle and the pitch angle of the aircraft.

The front disk structure 133 is a disk shaped structure. The front disk structure 133 is a transparent structure. The front disk structure 133 is formed from a fluid impermeable material. The front disk structure 133 mounts on the rear pan structure 131 such that the front disk structure 133 encloses the open face of the pan structure of the rear pan structure 131. The front disk structure 133 is a calibrated structure. By calibrated structure is meant that the front disk structure 133 visibly displays a calibration image that allows the pilot to determine the roll angle and the pitch angle of the aircraft. The pilot determines the roll angle and the pitch angle of the aircraft by comparing the position of the calibration image of the weighted disk structure 132 relative to the position of the calibration image of the front disk structure 133.

The lamp structure 134 is an electric circuit. The lamp structure 134 converts electric energy into electromagnetic radiation. The lamp structure 134 mounts on the rotating disk mount 135 such that the protected space formed by the rear pan structure 131 is illuminated. The lamp structure 134 ensures that the instrument structure 101 is visible to the pilot in dark conditions.

The fluid management structure 112 is a dampening structure. The fluid management structure 112 maintains a liquid phase compound in the instrument structure 101. The weighted disk structure 132 mounts in the instrument structure 101 such that the weighted disk structure 132 is partially submerged in the liquid phase compound. The weighted disk structure 132 forms a compensating structure that absorbs any transient forces that the aircraft is subjected to during flight. The fluid management structure 112 prevents the measured angles presented by the instrument structure 101 from being unduly influenced by transient forces. The fluid management structure 112 comprises an intake port 141, a discharge port 142, and a pump structure 143.

The pump structure 143 is a recirculation pump. The pump structure 143 continuously pumps the liquid phase compound contained in the instrument structure 101 through a fluidic circuit. The pump structure 143 ensures that the liquid phase compound maintains a homogenous solution that ensures a constant viscosity of the liquid phase compound.

The discharge port 142 is a fluid port. The discharge port forms a fluidic connection between the instrument structure 101 and the pump structure 143. The pump structure 143 draws the liquid phase compound out of the instrument structure 101 through the discharge port 142.

The intake port 141 is a fluid port. The intake port 141 forms a fluidic connection between the instrument structure 101 and the pump structure 143. The pump structure 143 pumps the liquid phase compound back into the instrument structure 101 through the intake port 141.

The pedestal structure 113 is a prism shaped structure. The pedestal structure 113 is a hollow structure. The pedestal structure 113 is a disk shaped structure. The pedestal structure 113 is a load bearing structure. The pedestal structure 113 forms the structure of the instrument structure 101 that secures the instrument structure 101 within the cockpit of the plane. The display structure 111 attaches to the pedestal structure 113 such that the display structure 111 rotates relative to the pedestal structure 113. A portion of the accessory structure 102 mounts within the hollow interior of the pedestal structure 113. The pedestal structure 113 comprises a base plate 151, a locking hinge structure 152, and a slip instrument 153.

The base plate 151 forms the disk shaped structure of the pedestal structure 113. The base plate 151 forms the load bearing structure of the pedestal structure 113. The base plate 151 forms the hollow structure of the pedestal structure 113. The base plate 151 forms the structure that secures the invention 100 to the cockpit of the slip angle. The base plate 151 forms the protected space that encloses a portion of the accessory structure 102.

The locking hinge structure 152 is a fastening device. The locking hinge structure 152 secures the instrument structure 101 to the base plate 151 such that the instrument structure 101 rotates relative to the base plate 151. The locking hinge structure 152 is a locking hinge. The locking hinge structure 152 locks the instrument structure 101 into a fixed position relative to the base plate 151.

The slip instrument 153 is a mechanical structure. The slip instrument 153 mounts on the lateral face of the disk structure of the base plate 151. The slip instrument 153 measures and visibly displays the slip angle of the aircraft.

The accessory structure 102 is an electrical device. A portion of the accessory structure 102 mounts in the hollow interior of the pedestal structure 113. The balance of the accessory structure 102 mounts on the exterior surface of the display structure 111 of the instrument structure 101. The accessory structure 102 is positioned on the display structure 111 such that the accessory structure 102 is visible to the pilot of the aircraft.

The accessory structure 102 electrically connects to the flight controls of the aircraft. The accessory structure 102 receives an electric signal from the flight controls of the aircraft. The received electric signals contains a measured parameter of the aircraft. The accessory structure 102 converts the received electric signal into a visible display. The accessory structure 102 visibly displays the measured parameter from the display structure 111 of the instrument structure 101.

The accessory structure 102 comprises a logic module 121, a communication module 122, a power circuit 123, a plurality of display structures 124, an airspeed display 125, and an elevation display 126.

The logic module 121 is an electric circuit. The logic module 121 is a programmable device. The logic module 121 controls the operation of the accessory structure 102. The communication module 122 electrically connects to the logic module 121. The logic module 121 controls the operation of the communication module 122. The plurality of display structures electrically connects to the logic module 121. The logic module 121 controls the operation of the plurality of display structures 124. The communication module 122 electrically connects to the flight control system of the aircraft. The communication module 122 receives the electric signal from the flight controls of the aircraft that encodes one or more measured flight parameters of the aircraft.

The communication module 122 transmits the received electric signal to the logic module 121. The logic module 121 decodes the electric signal received from the communication module 122 to determine the measured flight parameters. The logic module 121 reencodes the decoded flight parameters into a subsequent electric signal that is transmitted to the plurality of display structures 124. Each display structure selected from the plurality of display structures 124 is a display device. Each display structure selected from the plurality of display structures 124 electrically connects to the logic module 121. Each display structure selected from the plurality of display structures 124 receives the subsequent electric signal from the logic module 121. Each display structure selected from the plurality of display structures 124 decodes the subsequent electric signal into an image that is visibly displayed in the cockpit of the aircraft.

In the first potential embodiment of the disclosure, the electric signal received by the communication module 122 encodes the airspeed and the elevation of the aircraft. The airspeed display 125 is a display structure selected from the plurality of display structures 124. The airspeed display 125 visibly displays the airspeed of the aircraft. The airspeed display 125 mounts on the front disk structure 133 of the instrument structure 101. The elevation display 126 is a display structure selected from the plurality of display structures 124. The elevation display 126 visibly displays the elevation of the aircraft. The elevation display 126 mounts on the front disk structure 133 of the instrument structure 101.

The power circuit 123 is an externally provided source of electric energy. The power circuit 123 provides the accessory structure 102 and the pump structure 143 with the electric energy required for operation.

The following definitions were used in this disclosure:

Aircraft: As used in this disclosure, an aircraft is a vehicle that moves through the atmosphere (or a vacuum) without requiring a structural load path to a supporting surface.

Airfoil: As used in this disclosure, an airfoil is a curved structure. The airfoil is designed to move through a fluid. The design of the curvature of the airflow manipulates the forces created by the flow of the fluid around the airflow such that mechanical work is performed by the airfoil. The wing of an aircraft is an example of an airfoil. The wing is designed to maximize the lift produced by the flow of air around the wing. By lift is meant a directed force that is generated by the fluid flow that is perpendicular to the direction of the fluid flow. The term drag refers to a force that is generated by the interaction of the wing and the fluid flow. The direction of drag is parallel to the direction of the fluid flow. The term camber is used to describe a hypothetical line that runs from the leading edge of an airfoil to the trailing edge of the airfoil. The angle of attack of an airfoil means the angle between the camber and the direction of the fluid flow around the airfoil.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Associate: As used in this disclosure, the term associate is used to describe a relationship between a first object and a second object. The use of the term associated implies both: a) that the first object works with the second object in order to accomplish a task necessary for the implementation of the invention (such as joining two objects together); and, b) the relationship remains stable through the accomplishment of the task. By stable is meant that neither the first object or the second object are intended to be interchanged with a third object during the use of the invention.

Ballast: As used in this disclosure, ballast refers to an inert and heavy subcomponent of a structure that: a) lowers the center of mass of the structure; and, b) stabilizes the structure so that the structure is difficult to move or rotate. The weight of the ballast is often formed from a bulk solid material.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Buffer: As used in this disclosure, a buffer is a dampening structure that connects a first device or structure to a second device or structure. The buffer is a compensating device that dampens the exchange of energy between the first device and the second device.

Cant: As used in this disclosure, a cant is an angular deviation from one or more reference lines (or planes) such as a vertical line (or plane) or a horizontal line (or plane).

Calibration: As used in this disclosure, a calibration refers to a standard scale that is marked on an instrument and that is used for measurement. In its verbal form, to calibrate refers to comparing an instrument's calibration against a known and trusted standard to ensure that the calibration of the instrument remains correct.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Mass: As used in this disclosure, the center of mass refers to a point within a structure wherein a force applied to the point will cause the structure to move without rotation. The center of mass is commonly, but not always, the first moment of the structure normalized by the mass of the structure. While there are technical differences, the center of gravity of an object can be considered a synonym for the center of mass when the object is contained within the atmosphere of the earth.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Communication Link: As used in this disclosure, a communication link refers to the structured exchange of data between two objects.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Dampening: As used in this disclosure, dampening refers to a structure that: a) reduces the tendency of an object or system to vibrate or oscillate; or, b) reduces the sensitivity of an object or system to impulses.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Display: As used in this disclosure, a display is a surface upon which is presented an image, potentially including, but not limited to, graphic images and text. The image is interpretable by an individual viewing the projected image in a meaningful manner. A display device refers to an electrical device used to present these images.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Fluidic Circuit: As used in this disclosure, a fluidic circuit is a closed loop path through which a fluid flows. The closed loop will generally initiate and terminate at reservoir.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Instrument: As used in this disclosure, an instrument is a device used for taking a measurement of a physical phenomenon.

Interior: As used in this disclosure, the interior is used as a relational term that implies that an object is contained within the boundary of a structure or a space.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Lip: As used in this disclosure, a lip refers to the region of the lateral face of a pan or tube structure that abuts the perimeter of the open face of the pan or tube structure. By abutting the perimeter of the open face is meant that the lip forms a brink with the surface that forms the perimeter of the open face. The lip of the interior surface of the pan structure is called the interior lip. The lip of the exterior surface of the pan structure is called the exterior lip. The region of the lateral face of a pan structure that abuts the perimeter of the closed face of the pan structure is called the brink lip.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load of an Object: As used in this disclosure, the term load of an object refers to an object that is inserted into a load path. The load of an object refers to the sum of the forces (including the force of gravity) that are applied to the object.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Mass: As used in this disclosure, refers to a quantity of matter within a structure. Mass is measured and quantified by the reaction of the structure to a force. Mass can also be roughly quantified as a function of atomic composition and the number of atoms contained within the structure. The term weight refers to the quantification of a mass that is exposed to the force of gravity.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Pitch: As used in this disclosure, the term pitch refers to the rotation or oscillation of a vehicle around the lateral axis of a vehicle. When a vehicle is resting in a normal position on a level surface, the lateral axis is defined as the axis that: 1) is perpendicular to the roll axis; and, 2) is parallel to the level surface. In this definition, the level surface is strictly a reference in the sense that the definition of the lateral angle remains unchanged should the surface change. The lateral angle is also commonly referred to as the pitch axis. More colloquially, pitch would be referred to as moving the nose of the vehicle up or down.

Pivot: As used in this disclosure, a pivot is a rod or shaft around which an object rotates or swings.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Reservoir: As used in this disclosure, a reservoir refers to a container or containment system that is configured to store a fluid.

Roll: As used in this disclosure, the term roll refers to a rotation or oscillation of a vehicle around the axis of the vehicle that is defined by the nominal direction of travel of the vehicle. This described axis is commonly referred to as the roll axis or the longitudinal axis. By nominal direction of travel of the vehicle is meant the anticipated forward or backward direction of a vehicle or, more colloquially, the direction the front of the vehicle is going. An example of a difference between the nominal direction of travel and actual direction of travel occurs with aircraft in a heavy cross wind. In this situation, the actual direction of travel of the aircraft will not align with the longitudinal axis.

Rotation: As used in this disclosure, rotation refers to the cyclic movement of an object around a fixed point or fixed axis. The verb of rotation is to rotate.

Solid: As used in this disclosure, a solid refers to a state (phase) of matter that: 1) has a fixed volume; and, 2) does not flow.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tube: As used in this disclosure, a tube is a hollow cylindrical device that is used for transporting liquids and gases. In this disclosure, the terms inner diameter and outer diameter are used as they would be used by those skilled in the plumbing arts. The line that connects the center of the first base of the cylinder to the center of the second base of the cylinder is referred to as the axis of the cylinder or the centerline of the tube. When two tubes share the same centerline they are said to be aligned. When the centerlines of two tubes are perpendicular to each other, the tubes are said to be perpendicular to each other. The face of the tube corresponds to the face of a solid cylinder: the face of the cylinder incorporates what is left of the surface area of the cylinder after the surface area of the faces are excluded.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wireless: As used in this disclosure, wireless is an adjective that is used to describe a communication link between two devices that does not require the use of physical cabling.

Wireless Communication Link: As used in this disclosure, a wireless communication link is a previously determined channel that is used to wirelessly exchange information between one or more transceivers.

Yaw: As used in this disclosure, the term yaw refers to the rotation or oscillation of a vehicle around the perpendicular axis of a vehicle. The perpendicular axis is defined as the axis that: 1) is perpendicular to the roll axis; and, 2) perpendicular to the pitch axis. The perpendicular axis is also commonly referred to as the yaw axis. More colloquially, yaw would be referred to as a spin.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. An aircraft heads up display comprising;
an instrument structure and an accessory structure;
wherein the accessory structure mounts on and in the instrument structure;
wherein the aircraft heads up display is configured for use with an aircraft;
wherein the aircraft heads up display measures: a) a roll angle of the aircraft; b) a pitch angle of the aircraft; and, c) a slip angle of the aircraft;
wherein the aircraft heads up display is an instrument;
wherein the aircraft heads up display is a mechanical structure;
wherein the roll angle of the aircraft is a measure of the angle between the plane of the wings or the aircraft relative to a horizontal orientation;
wherein the pitch angle is a measure of the angle between the primary sense of direction of the aircraft and the horizontal orientation;
wherein the slip angle is the measure of the angle between the primary sense of direction of the aircraft and the direction of the air flowing over the aircraft;
wherein the instrument structure measures the roll angle, the pitch angle, and the slip angle of the aircraft;
wherein the accessory structure forms an electric connection with the aircraft;
wherein the accessory structure displays other measured flight parameters of the aircraft;
wherein the instrument structure is a physical device;
wherein the instrument structure is a measurement device;
wherein the instrument structure mounts in the cockpit of the aircraft;
wherein the instrument structure is positioned in the cockpit of the aircraft such that the cant between the primary sense of direction of the aircraft is fixed;
wherein the instrument structure is positioned in the cockpit of the aircraft such that the instrument structure is visible to the pilot of the aircraft;
wherein the physical structure of the instrument structure is sensitive to the motion of the aircraft relative to the force of gravity;
wherein the instrument structure visibly displays the roll angle of the aircraft during flight;
wherein the instrument structure visibly displays the pitch angle of the aircraft during flight;
wherein the instrument structure visibly displays the slip angle of the aircraft during flight;
wherein the accessory structure mounts on and in the instrument structure;
wherein the accessory structure is an electrical device;
wherein a portion of the accessory structure mounts in the hollow interior of the pedestal structure;
wherein the balance of the accessory structure mounts on the exterior surface of the display structure of the instrument structure;
wherein the accessory structure is positioned on the display structure such that the accessory structure is visible to the pilot of the aircraft;
wherein the accessory structure electrically connects to the flight controls of the aircraft;
wherein the accessory structure receives an electric signal from the flight controls of the aircraft;
wherein the received electric signals contains a measured parameter of the aircraft;
wherein the accessory structure converts the received electric signal into a visible display;
wherein the accessory structure visibly displays the measured parameter from the display structure of the instrument structure;

wherein the instrument structure comprises a display structure, a fluid management structure, and a pedestal structure;
wherein the display structure is a mechanical structure;
wherein the display structure forms the structure of the instrument structure that is sensitive to the motion of the aircraft relative to the force of gravity;
wherein the display structure visibly displays the roll angle of the aircraft during flight;
wherein the display structure visibly displays the pitch angle of the aircraft during flight;
wherein the display structure visibly displays the slip angle of the aircraft during flight;
wherein the fluid management structure is a dampening structure;
wherein the fluid management structure maintains a liquid phase compound in the instrument structure;
wherein the weighted disk structure mounts in the instrument structure such that the weighted disk structure is submerged in the liquid phase compound;
wherein the weighted disk structure forms a compensating structure that absorbs any transient forces that the aircraft is subjected to during flight;
wherein the fluid management structure prevents the measured angles presented by the instrument structure from being unduly influenced by transient forces;
wherein the pedestal structure is one of a prism shaped structure;
wherein the pedestal structure is a hollow structure;
wherein the pedestal structure is a disk shaped structure;
wherein the pedestal structure is a load bearing structure;
wherein the pedestal structure forms the structure of the instrument structure that secures the instrument structure within the cockpit of the aircraft;
wherein the display structure attaches to the pedestal structure such that the display structure rotates relative to the pedestal structure;
wherein a portion of the accessory structure mounts within the hollow interior of the pedestal structure.

2. The aircraft heads up display according to claim 1,
wherein the display structure comprises a rear pan structure, a weighted disk structure, a front disk structure, a lamp structure, and a rotating disk mount;
wherein the rear pan structure is a pan shaped structure;
wherein the rear pan structure is formed from a transparent material;
wherein the rear pan structure is formed from a fluid impermeable material;
wherein the rear pan structure forms a protected space that contains: a) the weighted disk structure; b) the rotating disk mount; and, c) the liquid phase compound of the fluid management structure;
wherein the rear pan structure is the structure of the instrument structure that attaches to the pedestal structure;
wherein the weighted disk structure is a disk shaped structure;
wherein the weighted disk structure is a transparent structure;
wherein the weighted disk structure mounts in the protected space forms by the rear pan structure;
wherein the weighted disk structure is fully contained within the rear pan structure;
wherein the rotating disk mount physically secures the weighted disk structure in the rear pan structure such that the weighted disk structure rotates freely within the rear pan structure;
wherein the weighted disk structure is a weighted structure;
wherein by weighted structure is meant that the weighted disk structure has a non-uniform weight distribution that offsets the center of mass of the weighted disk structure from the center of rotation of the weighted disk structure;
wherein the weighted disk structure has a non-uniform weight distribution that offsets the center of mass of the weighted disk structure from the center axis of the weighted disk structure;
wherein the offset of the center of mass from the axis of rotation ensures that the weighted disk structure will always maintain constant position relative to the force of gravity;
wherein by a constant position relative to the force of gravity is meant that a perpendicular line drawn from the axis of rotation of the weighted disk structure and the center of mass of the weighted disk structure will always be parallel to the force of gravity;
wherein the weighted disk structure is a calibrated structure;
wherein by calibrated structure is meant that the weighted disk structure visibly displays a calibration image that allows the pilot to determine the roll angle and the pitch angle of the aircraft;
wherein the front disk structure is a disk shaped structure;
wherein the front disk structure is a transparent structure;
wherein the front disk structure is formed from a fluid impermeable material;
wherein the front disk structure mounts on the rear pan structure such that the front disk structure encloses the open face of the pan structure of the rear pan structure;
wherein the front disk structure is a calibrated structure;
wherein by calibrated structure is meant that the front disk structure visibly displays a calibration image that allows the pilot to determine the roll angle and the pitch angle of the aircraft;
wherein the pilot determines the roll angle and the pitch angle of the aircraft by comparing the position of the calibration image of the weighted disk structure relative to the position of the calibration image of the front disk structure;
wherein the lamp structure is an electric circuit;
wherein the lamp structure converts electric energy into electromagnetic radiation;
wherein the lamp structure mounts on the rotating disk mount such that the protected space formed by the rear pan structure is illuminated;
wherein the lamp structure ensures that the instrument structure is visible to the pilot in dark conditions.

3. The aircraft heads up display according to claim 2,
wherein the fluid management structure comprises an intake port, a discharge port, and a pump structure;
wherein the pump structure is a recirculation pump;
wherein the pump structure continuously pumps the liquid phase compound contained in the instrument structure through a fluidic circuit;
wherein the pump structure ensures that the liquid phase compound maintains a homogenous solution that ensures a constant viscosity of the liquid phase compound;
wherein the discharge port is a fluid port;
wherein the discharge port forms a fluidic connection between the instrument structure and the pump structure;

wherein the pump structure draws the liquid phase compound out of the instrument structure through the discharge port;
wherein the intake port is a fluid port;
wherein the intake port forms a fluidic connection between the instrument structure and the pump structure;
wherein the pump structure pumps the liquid phase compound back into the instrument structure through the intake port.

4. The aircraft heads up display according to claim 3,
wherein the pedestal structure comprises a base plate, a locking hinge structure, and a slip instrument;
wherein the base plate forms the disk shaped structure of the pedestal structure;
wherein the base plate forms the load bearing structure of the pedestal structure;
wherein the base plate forms the hollow structure of the pedestal structure;
wherein the base plate forms the structure that secures the aircraft heads up display to the cockpit of the slip angle;
wherein the base plate forms the protected space that encloses a portion of the accessory structure;
wherein the locking hinge structure is a fastening device;
wherein the locking hinge structure secures the instrument structure to the base plate such that the instrument structure rotates relative to the base plate;
wherein the locking hinge structure is a locking hinge;
wherein the locking hinge structure locks the instrument structure into a fixed position relative to the base plate;
wherein the slip instrument is a mechanical structure;
wherein the slip instrument mounts on the lateral face of the disk structure of the base plate;
wherein the slip instrument measures and visibly displays the slip angle of the aircraft.

5. The aircraft heads up display according to claim 4,
wherein the accessory structure comprises a logic module, a communication module, a power circuit, a plurality of display structures, an airspeed display, and an elevation display;
wherein the logic module is an electric circuit;
wherein the logic module is a programmable device;
wherein the logic module controls the operation of the accessory structure;
wherein the communication module electrically connects to the logic module;
wherein the logic module controls the operation of the communication module;
wherein the plurality of display structures electrically connects to the logic module;
wherein the logic module controls the operation of the plurality of display structures;
wherein the communication module electrically connects to the flight control system of the aircraft;
wherein the communication module receives the electric signal from the flight controls of the aircraft that encodes one or more measured flight parameters of the aircraft;
wherein the communication module transmits the received electric signal to the logic module;
wherein the logic module decodes the electric signal received from the communication module to determine the measured flight parameters;
wherein the logic module reencodes the decoded flight parameters into a subsequent electric signal that is transmitted to the plurality of display structures;
wherein each display structure selected from the plurality of display structures is a display device;
wherein each display structure selected from the plurality of display structures electrically connects to the logic module;
wherein each display structure selected from the plurality of display structures receives the subsequent electric signal from the logic module;
wherein each display structure selected from the plurality of display structures decodes the subsequent electric signal into an image that is visibly displayed in the cockpit of the aircraft;
wherein the electric signal received by the communication module encodes the airspeed and the elevation of the aircraft;
wherein the airspeed display is a display structure selected from the plurality of display structures;
wherein the airspeed display visibly displays the airspeed of the aircraft;
wherein the airspeed display mounts on the front disk structure of the instrument structure;
wherein the elevation display is a display structure selected from the plurality of display structures;
wherein the elevation display visibly displays the elevation of the aircraft;
wherein the elevation display mounts on the front disk structure of the instrument structure;
wherein the power circuit is an externally provided source of electric energy;
wherein the power circuit provides the accessory structure and the pump structure with the electric energy required for operation.

* * * * *